(12) United States Patent
Lacy

(10) Patent No.: US 7,002,159 B2
(45) Date of Patent: Feb. 21, 2006

(54) BORON COATED STRAW NEUTRON DETECTOR

(75) Inventor: Jeffrey L. Lacy, Houston, TX (US)

(73) Assignee: Proportional Technologies, Inc., Houston, TX (US)

(*) Notice: Subject to any disclaimer, the term of this patent is extended or adjusted under 35 U.S.C. 154(b) by 279 days.

(21) Appl. No.: 10/712,692

(22) Filed: Nov. 13, 2003

(65) Prior Publication Data

US 2005/0258373 A1 Nov. 24, 2005

Related U.S. Application Data

(60) Provisional application No. 60/425,984, filed on Nov. 13, 2002.

(51) Int. Cl.
*G01T 3/00* (2006.01)
(52) U.S. Cl. .............................. 250/390.01
(58) Field of Classification Search ............ 250/390.01
See application file for complete search history.

(56) References Cited

U.S. PATENT DOCUMENTS

| | | | | |
|---|---|---|---|---|
| 3,483,377 A | * | 12/1969 | Borkowski et al. | 250/374 |
| 4,359,372 A | * | 11/1982 | Nagai et al. | 204/192.21 |
| 4,695,476 A | * | 9/1987 | Feild, Jr. | 427/6 |

* cited by examiner

*Primary Examiner*—David Porta
*Assistant Examiner*—Christopher Webb
(74) *Attorney, Agent, or Firm*—Akin Gump, Strauss Hauer & Feld LLP; Charles M. Cox

(57) ABSTRACT

A neutron detector technology based on $^{10}B$ thin film conversion of neutrons and detection of neutron capture reaction products in a counter gas within a thin straw tube detector body is described. This neutron detector is based on gas-filled thin wall straw tubes, modified for the conversion of neutrons in a very thin coating, or layer, of $^{10}B$, applied for example as a sputter-coated film of $^{10}B_4C$, that lines the interior, or inside of the straw tube surface; and the subsequent detection of the neutron reaction products in the counter gas. One embodiment of this invention employs a closely-packed array of $^{10}B_4C$-lined straw tubes employing a very thin and therefore high efficiency $^{10}B_4C$ layer, hence removing the barrier to efficient neutron capture reaction product escape while still providing for efficient neutron capture by providing a plurality of very thin $^{10}B$ converters, each individual converter element providing efficient reaction product escape. Using such densely packed straw tube detectors of small diameter, a reasonable stack depth allows a high neutron detection efficiency to be achieved on the 1–10 Å wavelength range of thermal neutrons. The position of each interacting neutron can be accurately obtained with for example, resistive charge division readout combined with straw decoding electronics to determine the identity of the struck straw.

21 Claims, 11 Drawing Sheets

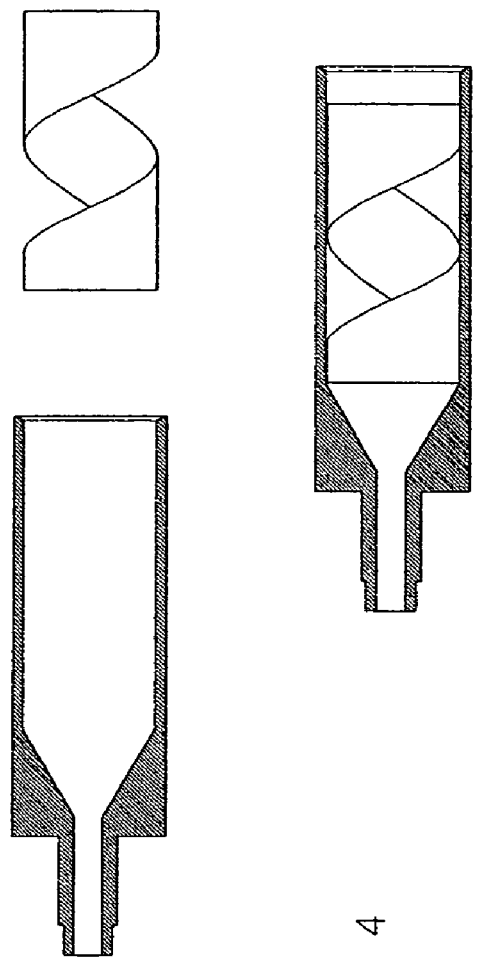
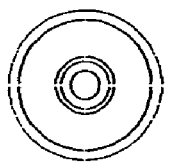
fig. 4

BORON COATED STRAW NEUTRON DETECTOR

CROSS-REFERENCE TO RELATED APPLICATIONS

This application is a regular U.S. Application that claims priority from U.S. Provisional Application Ser. No. 60/425,984, filed Nov. 13, 2002.

STATEMENTS REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

This invention relates to a thermal neutron detector the most elemental component of which is a $^{10}$B-lined straw tube which can be applied in multiple applications including neutron radiation survey and neutron imaging. The detector is also capable of counting gamma radiation alone or simultaneously with neutron counting.

2. Description of the Related Art

Neutron scattering is a very valuable technique which is critically important to materials science and structural biology applications. Neutron scattering is an important source of information about the atomic positions, motions, and magnetic properties of solid materials. As a beam of thermal neutrons is directed at a target material some neutrons will interact directly with the atomic nuclei of such material and "bounce" away at various angles related to the atomic arrangements that define the structure of the target material. This behavior is referred to as neutron diffraction, or neutron scattering.

With appropriate detectors one can count the scattered neutrons, measure their energies and the angles at which they scatter, map their final position and thereby calculate the atomic positions of the atoms in the target material that caused such scatter pattern. In this way one can determine details about the nature of target materials ranging from liquid crystals to superconducting ceramics, from proteins to plastics, and from metals to micelles to metallic glass magnets. The knowledge gained with respect to such materials has resulted in far-reaching advances in engineering, pharmaceutical and biotechnology industries, to name a few.

New facilities for neutron generation at much higher flux (neutron events/second), such as the Spallation Neutron Source (SNS) facility due for completion at Oak Ridge in 2006, will greatly enhance the capabilities of neutron scattering. The benefits offered by superior neutron scattering techniques extend to many fields and include, for example, development of improved drug therapies and materials that are stronger, longer-lasting, and more impact-resistant. However, in order to fully realize this greater neutron scatter potential these higher flux rates must be met with improved neutron scatter detection capabilities; particularly higher count rate capability in large area size detectors, while maintaining practicality.

The SNS facility will enhance the available thermal neutron flux by at least an order of magnitude above that now achievable at any other neutron science facility. This higher neutron beam intensity, together with time of flight energy discrimination provided by pulsed operation of the SNS facility, will facilitate unprecedented capabilities, which will be exploited in more than 18 experiment stations (http://www.sns.gov/). The markedly increased deliverable neutron flux imposes extreme rate requirements on the neutron scattering detectors in many of these facilities, which cannot now be met without fundamental detector improvements.

Although present $^3$He pressurized area detectors can provide needed spatial resolution, sensitivity and gamma ray discrimination, this $^3$He detector technology cannot now achieve the needed high rate operation, which, for many SNS detector stations, can reach rates over $10^8$ neutrons/sec, for detectors of 1 m$^2$ in area. The expansive scope of the experimental stations of the SNS has also pushed the area requirements of neutron detectors to many square meters. The high resolution powder diffractometer facility, for example, calls for 47 m$^2$ of detectors. Achieving such large areas for neutron detection with pressurized $^3$He technology is extremely expensive and difficult because of the complexity of the pressure containing structures required for $^3$He neutron detection. Current neutron detectors, such as $^3$He tubes, have significant practical limitations, including high cost, substantial weight and bulkiness, and are dangerous in portable use due to the high pressure of $^3$He they require.

A compelling need exist for alternative detectors with more favorable characteristics.

BRIEF SUMMARY OF THE INVENTION

A neutron detector technology based on $^{10}$B thin film conversion of neutrons and detection of neutron capture reaction products in a counter gas within a thin straw tube detector body is described. This neutron scatter detector is based on gas-filled thin wall straw tubes, modified for the conversion of neutrons in a very thin coating, or layer, of $^{10}$B, applied for example as a sputter-coated film of $^{10}$B$_4$C, that lines the interior, or inside of the straw tube surface; and the subsequent detection of the neutron reaction products in the counter gas.

Straw tube bodies for the neutron detector may be constructed by first applying a very thin coating/layer of a $^{10}$B containing substance to one surface of a thin substrate material which, after installation thereon of the $^{10}$B coating/layer, is of suitable mechanical properties such that the substrate material may be fabricated into straw tube structures. Further, the structural integrity of such substrate material should permit cutting and/or slitting into long lengths of ribbons without disturbance of the applied $^{10}$B coating, this so as to provide long continuous lengths of ribbon raw material that can be fabricated into straw tube bodies by high speed winding techniques as are now known for straw tube construction. Alternatively, such substrate material may first be produced in long continuous ribbon form and thereafter the thin $^{10}$B coating/layer applied to the ribbon material. The $^{10}$B of the coating may be produced employing any compound or mixture containing boron, which is preferably enriched in $^{10}$B, that can be applied as a coating to the substrate by a vapor deposition or sputter technique or other means, such as a sprayed on film which adheres to the substrate through a suitable binder. Such adherence must be capable of withstanding the rigors of the rapid winding process used in straw construction which imparts substantial small radius binding and abrasive forces as the material is forced against a cylindrical mandrel. The layer must further provide sufficient electrical conductivity to provide efficient conduction of electrical signals from the gas proportional detector. The compound of boron together with other elemental constituents or binder materials by which the $^{10}$B layer is applied to the substrate is utilized in a quantity so as to provide a coating layer to the substrate in an amount of from about 0.12 mg/cm$^2$ to about 1.2 mg/cm$^2$ and containing at least 10 wt % $^{10}$B and preferably the maximum fractional quantity of $^{10}$B. The preferable layer thickness of $^{10}$B$_4$C providing maximum efficiency with a minimum of detector layers is 0.25 mg/cm$^2$. High concentration of boron together with low cost is achieved by using the inexpensive boron compound, boron carbide, B$_4$C, the boron of which contains a high level of enrichment approaching 100% of $^{10}$B. Such a layer of 0.25 mg/cm$^2$ is the maximum thickness which permits efficient escape of both the alpha and $^7$Li fragments produced in the event of neutron capture in $^{10}$B, assuring efficient detection through gas ionization of such capture event when the thin layer is employed as the inner lining of a gas straw detector. The fraction of reaction products ($\alpha$ and $^7$Li) that escape from the B$_4$C layer and ionize the detector gas was established in a Monte Carlo simulation. The simulation assumed a B$_4$C layer of variable thickness d, with the $^{10}$B (n, $\alpha$) reaction taking place uniformly along d, such that 0.84 MeV $^7$Li ions and 1.47 MeV $\alpha$ particles were emitted isotropically and in opposite directions to one another (for simplicity, only the dominant branch of the reaction was considered, which leads to conservative estimates of escape efficiency; the other branch generates more energetic products, which have better chances for escape). Results showed that the mean range of these particles in B$_4$C is 3.20 $\mu$m for $\alpha$ and 1.56 $\mu$m for $^7$Li. Particles that have to traverse a distance larger than this range will likely never leave the layer. FIG. 9 shows the combined escape efficiency as a function of the layer thickness assuming escape is only detected at one face of the thin film (that side facing the gaseous interior of the detector). Clearly, the thinner the layer the higher the escape efficiency. At a layer thickness above about 1 $\mu$m a substantial limit on detector efficiency is imposed. At a thickness of 1 $\mu$m the maximum efficiency that can be achieved by stacking layers is about 78%. At a thickness of 2 $\mu$m of B$_4$C this efficiency drops dramatically to about 56%. Therefore designs in which high efficiency is required can only be achieved with a layer thickness on the order of 1 $\mu$m or less.

Ribbons of such $^{10}$B coated material may be helically wound with a second ribbon having no such $^{10}$B coating as an outer overlapping layer (i.e., one over the other) with application of a very thin fast setting adhesive layer onto a precision cylindrical mandrel, producing a strongly bonded and rigid, geometrically precise cylindrical detector body. Thereafter an anode wire is centrally positioned within each detector tube body and electrically insulated from the $^{10}$B coating. Means for providing a flow of a counter gas (e.g., 96% Ar-4% ethane) through the tube is connected to the tube and the anode wire and the $^{10}$B film, which also serves as a cathode shell, are connected to appropriate electrical circuitry for detecting the occurrence of neutron capture by $^{10}$B within the wall of a tube. Such elemental tube detectors can achieve element sizes (straw diameter) of 2 mm or less in lengths up to 2 meters, and can withstand decades of operation in extremely harsh radiation and counting conditions. One method by which such $^{10}$B coating can be provided is through sputter-coating with B$_4$C. The concentration of $^{10}$B can be employed in its natural abundance (20%), but preferably, an enriched $^{10}$B content, up to 100% $^{10}$B is advantageous to reduced the number of straw elements required. Such an enrichment can provide as much as a 5 fold sensitivity enhancement.

The preferred structure for detection of neutrons over a large area is a closely packed stack, or array, of such detector straws, of an overall stack or array thickness on the order of 5 cm or more for a diameter of 4 mm and with a length of 1 meter or more. Through use of a very thin $^{10}$B coating (optimally about 1 $\mu$m) within the tube interior, i.e., for example, in the form of a $^{10}$B$_4$C coating or film, the distributed detection stopping power of $^{10}$B per unit depth of such a small tube detector array can easily exceed that of $^3$He contained at practical pressures within an area detector. Because the $^{10}$B is distributed within and as part of a very thin film i.e., as contained within a thin film of B$_4$C, on the inside of each straw tube detector wall, efficient escape of the reaction decay products of neutron capture by $^{10}$B can be achieved, providing a thermal neutron (1.8 Å) detection efficiency of 65% or greater.

The overall detection efficiency of the proposed detector is dictated both by the probability of slow neutron interactions in the B$_4$C lining, and the ability of the reaction products to escape the lining and enter the filling gas, where they can be counted. Whereas the reaction products have a limited range and will reach the gas only if the B$_4$C layer is thin, the probability of neutron interactions in boron increases for a thicker lining. An array of B$_4$C-lined straw tubes offers improved detection efficiency, by providing more target material for incident neutrons, while at the same time maintaining a thin lining. The detection efficiency ($\epsilon$) for neutrons in an array of the proposed detector is given by $$\epsilon = f_e (1 - e^{-N\sigma t})$$

where $f_e$ is the escape efficiency, $\sigma$ is the neutron cross section for the $^{10}$B (n, a) reaction and N is the effective nuclear density of $^{10}$B in a detector array of depth t. The neutron cross section is a function of the wavelength $\lambda$ of the neutron, given by $\sigma = 2133 \lambda$ (for $\lambda$ in Å and $\sigma$ in barns). The nuclear density N is computed as $N = N_B(\pi d)/(0.866 D)$ where D is the straw tube diameter, d the $^{10}$B$_4$C film thickness in each straw, and $N_B$ the nuclear density of $^{10}$B in $^{10}$B-enriched B$_4$C (1.10×10$^{23}$ atoms/cm$^3$). The predicted efficiency for room temperature thermal neutrons (0.0253 eV) is plotted in FIG. 10 as a function of the B$_4$C film thickness, for array depths of 5 cm and 10 cm. Maximum efficiencies are observed at decreasing film thicknesses as the array deepens. Thus, a maximum efficiency of 65% is achieved for the 5 cm-deep array, at a B$_4$C film thickness of 1.0 $\mu$m; the 10 cm deep array can offer close to 78% efficiency, with a B$_4$C film thickness of 0.7 $\mu$m. By comparison, a single, planar layer of B$_4$C, that lines a charged particle detector, has a maximum thermal neutron (1.8 Å) detection efficiency of only 4.7%, at a film thickness of 3.2 $\mu$m, as shown in the same figure. This film thickness equals the average range of $\alpha$ particles in B$_4$C. As mentioned above, the improvement in efficiency offered by the proposed detector is due to the fact that, although the neutron interaction probability is benefited by the multiple layers of tubes, the B$_4$C lining remains thin enough to allow escape of the neutron reaction products.

Because of the linearly discrete nature of each straw tube detector element, area detectors composed of a closely packed array of a multiplicity of such straw tube detector elements can be arranged either in flat panel form, such as 1 m$^2$ area, or could be configured in curved sections to match the radius of the scattering geometry. Such arrangements are illustrated by views A and B, respectively, of FIG. 1. In this manner, a target can be essentially surrounded by such detectors, which because of their large size could be positioned at a large separation from the target in order to improve scattering angle measurement.

With simple charge division longitudinal coordinate readout such arrays constructed of 4 mm or smaller diameter straws can provide spatial resolution FWHM equal to or better than the straw diameter. Since an array of detectors of such form consists of several thousand individual straw elements per m$^2$, which can be read out independently in parallel, achievable event rates are very high. With appropriate electronics, a 1 m$^2$ detector can operate at an instantaneous count rate exceeding 3×10$^9$ events/sec and each individual event can be time tagged with a time resolution of less than 0.1 μsec, allowing accurate identification of neutron energy by time of flight. Because neutron events produce markedly higher levels of counter gas ionization, gamma ray events can be essentially eliminated by simple application of a pulse height threshold. Monte Carlo simulations indicate that with such simple pulse height/energy level threshold technique the gamma ray discrimination factor can exceed 10$^8$. Furthermore, considering basic elemental component cost, this new neutron imaging detector can be commercially produced economically, probably at a small fraction of the cost of a $^3$He detector of comparable sensitivity.

The straw tube detector/array, as here described, provides a unique technique for imaging thermal neutrons with good spatial resolution and high sensitivity. This light weight detector, which operates at ambient pressure, affords a low cost technology with highly advantageous properties for use in neutron scattering experiments, neutron imaging for contraband and nuclear weapons detection and identification, and other field applications of neutron surveillance.

The described straw detector element can additionally provide a low cost efficient neutron detection device for survey applications such as might be required for detection of fissile materials which emit neutrons. In such applications it may be advantageous to employ coatings which substantially deviate from the optimally efficient thickness described and which may for purposes of optimization of cost deviate as well from the optimum (maximum) concentration of $^{10}$B. In such applications the detection of neutron interaction position may be of little interest further reducing cost and complexity be eliminating complex position decoding circuitry.

The proposed straw detector is sensitive to gamma radiation, in addition to neutrons, and can thus be used as a dual purpose detector. Gammas interact in the material making up the wall of each straw detector; straws made out of materials with high atomic number (Z) and high density, such as lead, are very sensitive to gamma radiation. Following gamma inetractions in the straw material, the photo- and Compton-electrons generated must escape the wall and enter the gas where they can be counted (in a manner similar to that described for the neutron reaction products above). The type of gamma interaction in the wall, and the energy of the resulting electron depend on the energy of the incident photon. A Monte Carlo simulation was done to predict the gamma sensitivity of a 5-cm-deep array of straws, each 4 mm in diameter, and made out of a specified material. Results for lead, copper, stainless steel., aluminum and mylar, are shown in FIG. 11. Both flux (top) and dose (bottom) sensitivities are plotted, against the incident photon energy. The sensitivities are different for arrays of different dimensions and for straws of different wall thickness. The material (or a combination of materials) and its thickness can be varied in order to achieve the desired gamma sensitivity, depending on the application. For radiation dosimetry, for instance, an energy-independent response is ideal, and that could be achieved by fabricating the straw detectors out of stainless steel. The ease of manufacture of multiple layer thin wall structures offers the additional possibility of fine tuning of gamma ray response through the use of multiple materials such as stainless steel foil combine with aluminum foil.

Gamma rays interacting in the straw wall produce much smaller signals than the neutron events. Gammas at most and in very rare instances can deposit as much as 50 kev–150 kev. Essentially all neutron interactions deposit more energy than this. The average neutron interaction is about 500–700 kev. So neutrons are counted by setting a threshold somewhere in the range 50–150 keV and counting signals above this threshold as neutron events. To count gammas a much lower threshold is used at about 0.5 kev. A gamma is counted when a signal is produced with a level between 0.5 kev and 50 kev.

BRIEF DESCRIPTION OF THE SEVERAL VIEWS OF THE DRAWINGS

FIG. 4 illustrates the straw tube end fitting sleeve and a twister that is securely locatable therein, this to form the end tube fitting for the straw tube of FIG. 1.

DETAILED DESCRIPTION OF THE INVENTION

Figure 1:
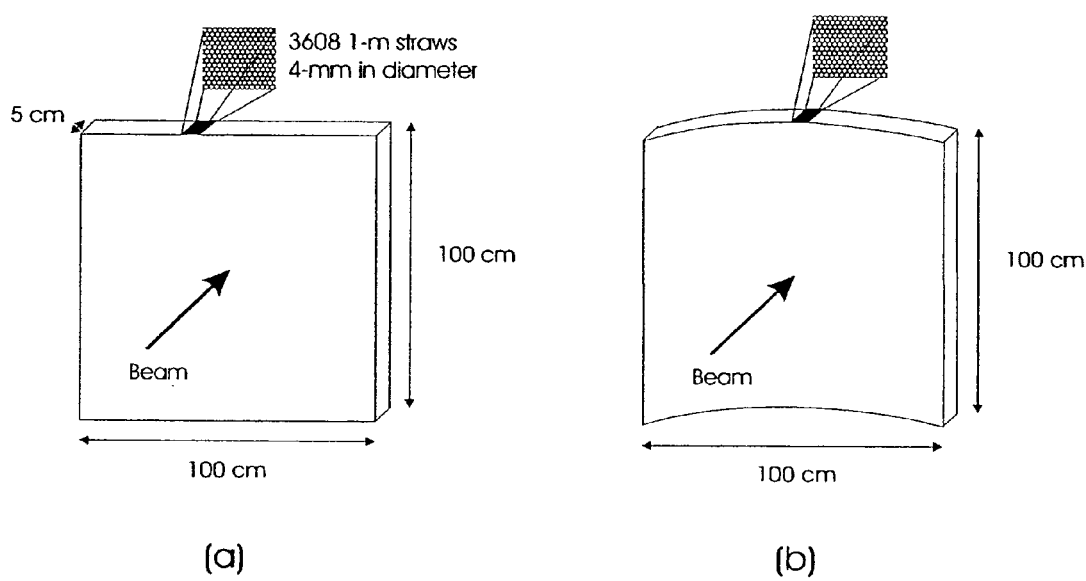
FIG. 1 illustrates a flat panel form of a closely packed array of straw tube neutron detectors (view A) and a curved panel form of such detector array (view B).

This invention involves many materials and many associations of such materials and elements made there from all to the purpose of the creation of a neutron detector of practical utility, of a large area detection capability, and in its preferred embodiment a capability of detecting neutron interaction within a reasonably precise spatial location of such large area neutron detector.

The detection of thermal neutrons is based on the generation of secondary radiations, following the capture of neutrons in a converter material. A converter material reaction commonly used is that of neutron (n) capture in boron-10 ($^{10}$B), described by,

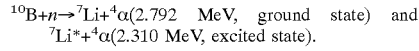
$^{10}$B+n→$^{7}$Li+$^{4}$α(2.792 MeV, ground state) and
$^{7}$Li*+$^{4}$α(2.310 MeV, excited state).

The energy released by the reaction is 2.310 million electron volts (MeV) in 94% of all reactions (2.792 MeV in the remaining 6%), and equals the energy imparted to the two reaction products (the energy of the captured neutron is negligible by comparison). The reaction products, namely an alpha particle (α) and a lithium nucleus ($^{7}$Li) are emitted isotropically from the point of neutron capture by $^{10}$B in exactly opposite directions and, in the case of the dominant excited state, with kinetic energies of 1.47 MeV and 0.84 MeV, respectively (dictated by the conservation of energy and momentum).

Boron-lined proportional detectors based on the general principle above described have been employed for many years, but such detectors achieve at most a few percent efficiency, due to the fact that the single or at most two $^{10}$B foil thicknesses therein needed for a substantial capture of such neutrons exceeds the escape range of the neutron capture reaction products; so in many instances, capture reaction products can not escape. (the optimal thickness in boron coated detectors currently is 1 mg/cm$^2$) Thus, only conversions of neutrons in a very thin layer near the surface of the $^{10}$B foil adjacent the counting gas are detected efficiently. Since this very thin layer of the $^{10}$B foil captures only a very small percentage of the incident neutrons, efficiency of a neutron detector of such simple design is low.

Preparing the $^{10}$B converter in the form of a very thin layer on the inside wall of a thin walled cylinder structure allows one of the two charged reaction particles (the one directed inward, whether alpha or $^{7}$Li) to escape and be counted, through ionization of the counter gas. The opposing reaction particle cannot penetrate the wall of even a very thin cylinder and thus does not excite an adjacent detector cylinder. Therefore, when a thin cylinder structure with a very thin interior coating of $^{10}$B is utilized, highly accurate location of the interaction reaction can be obtained.

One embodiment of the new detector design of this invention employs a closely-packed array of $^{10}$B$_4$C-vey thin layer lined straw tubes. This design hence removes the barrier to efficient neutron capture reaction product escape while still providing for efficient neutron capture by providing a plurality of very thin $^{10}$B converters, each individual converter layer providing efficient reaction product escape. Using multiple stacks of such straw tube detectors, a reasonable stack depth allows a high neutron detection efficiency to be achieved in the 1–10 Å wavelength range of thermal neutrons. Furthermore, the elemental component of such detector, the straw tube element, may be made to have a very low sensitivity to gamma radiation, which is an essential attribute in many applications.

Elemental Straw Tube Detector Structure—Construction

Figure 2:
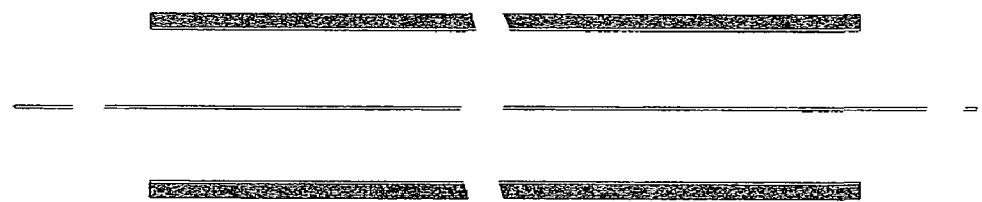
FIG. 2 illustrates in sectional view the basic straw tube structure for detection of neutron capture reaction products.

As a first material in the production of the elemental straw tube component of the neutron detector there is a requirement for production of a narrow film having one surface coated with a layer of $^{10}$B, preferably in the form of B$_4$C, preferably of a thickness of 0.5 to 3 μm. From such B$_4$C coated narrow film strips or ribbons there is produced small diameter straw tubes of up to 2 meters in length having the thin layer of B$_4$C preferably of a thickness of 0.5 to 3 μm on their interior surface. Such straws tubes are then installed with an end fitting means, affixed in each end of said straw tube, which is capable of receiving and positioning a wire centrally within said straw tube out of electrical contact with said coating of B$_4$C and capable of allowing a flow of gas through said tube. The straw tube is then provisioned with a wire positioned centrally within said straw tube out of electrical contact with said coating of B$_4$C. This structure is the elemental neutron detector structure which is illustrated in FIG. 2 in a cross section view. For convenience the end fitting are not illustrated in FIG. 2 itself. In FIG. 2 the straw tube detector element 10 comprises a straw tube body 12 the interior surface of which carries a B$_4$C coating 14 and an anode wire 16 which is centrally located in tube 12 out of electrical contact with the B$_4$C coating 14. Preferably the B$_4$C coating has an enriched content of $^{10}$B compared to the natural abundance of $^{10}$B in elemental B. The thickness of the B$_4$C layer is not greater than the thickness of B$_4$C through which the neutron capture reaction products can penetrate, or escape, i.e., no greater than about 3.5 μm. Although B$_4$C is a preferred material from which to form the thin $^{10}$B layer, alternative $^{10}$B containing substances can be used, such as elemental B, B$_{10}$H$_{14}$, BN, B$_2$O$_3$, B$_6$Si, B$_3$Si, B$_2$S$_5$, B$_2$S$_3$ and the like. Whatever boron compound is employed to provide the $^{10}$B content of the coating is applied to the substrate surface at a rate of 0.12 mg/cm$^2$ to about 1.2 mg/cm$^2$, preferably at a rate of 0.19 mg/cm$^2$ to about 0.5 mg/cm$^2$, and most preferably at about 0.25 mg/cm$^2$.

Aluminum and plastic were evaluated as backing film materials for a B$_4$C coating and as the base material for the straw tube body. Mylar®(C$_5$H$_4$O$_2$) plastic film was used. Since the density of aluminum (2.7 g/cm$^3$) is nearly double that of Mylar® (1.4 g/cm$^3$), the plastic is advantageous with respect to minimization of gamma ray sensitivity. Another criterion in selection of the straw material is maintenance of structural integrity. Any other plastic film forming material of a density less that aluminum may be employed. Such plastic materials for straw formation are well known to those skilled in the art.

Boron, in the form of boron carbide (B$_4$C), was vapor deposited on aluminum and Mylar® foils using a plasma deposition process. The B$_4$C coating was found to be extremely adherent and mechanically stable when applied to substances like aluminum and plastics. Deposition was accomplished by wrapping narrow 9.5 mm wide and 25 μm thick strips or ribbons of the respective materials around a cylindrical drum (16" diameter×16" long), which thereafter was rotated adjacent to a sputtering head. A tape running down the side of the drum kept the strips in place (but also produced a 1 cm dead space every 50"). Using this process, a highly uniform boron carbide coating was achieved on continuous strips of material with a length up to 50 meters. Such continuous material is required in straw construction, which utilizes high speed automated equipment.

Straws are manufactured using a high speed winding technique in which narrow ribbons of plastic or metal-coated plastic film are helically wound around a cylindrical mandrel of precise dimension. Quickset adhesive may be applied to the film on the fly to instantly bond the multiple layers of plastic film together. In this manner, large quantities can be produced at high rates and thus low cost. The straw tube preferably has an areal density (weight of the straw tube divided by the surface area of the straw tube) of less than 90 mg/cm².

Samples of each $B_4C$ coated material, in lengths of 10–25 meters, were sent to Lamina Dielectrics, Ltd., Sussex, England, and about 35 meters of 4 mm diameter straws were produced with various boron coating thicknesses and using both the Mylar® and aluminum backing. For several practical reasons, the Mylar® straws were found to be superior to the aluminum straws. During straw fabrication, the aluminum material was found to be susceptible to breakage, resulting in interruption of the winding process in order to splice in additional material, which is incompatible with efficient commercial production. The aluminum straws also were more difficult to work with during detector assembly. Greater care was required to avoid crushing the aluminum straws when cutting them into precise working segments. Finally, the aluminum straws demonstrated no advantage with regard to rigidity or basic performance. Mylar® backing was concluded to be the better structural choice. However because plastic contains high levels of hydrogen having a high elastic scattering cross section for thermal neutrons aluminum may nonetheless be the preferred material in many applications.

Ultimately an anode wire is precisely centered within the straw tube. Although laborious, this wire installation-centering could be done on a straw by straw basis and then the anode wire installed tubes could be assembled into an array of straws. However, the preferred assembly procedure for the large area thermal neutron detector is described below.

A large area detector based on this straw technology can be achieved practically by dividing the detector into a modest number of independent modules, each consisting of an N×M array of straws. For example, using 50 straw modules, a 5 cm thick, 1 m² detector, consisting of about 3600 straws, would consist of 72 modules in a close packed configuration. Thus, the feasibility of production of densely packed large-area arrays of such straw tube detectors depends upon practical and relatively low-cost methods of module fabrication and readout. Although each straw tube detector serves as an individual detection element, the module serves as a basic structural and readout unit. Therefore, techniques for volume fabrication and assembly in modules were considered from the outset and developed hand-in-hand with the straw tube detector design.

Module Assembly

Figure 3:
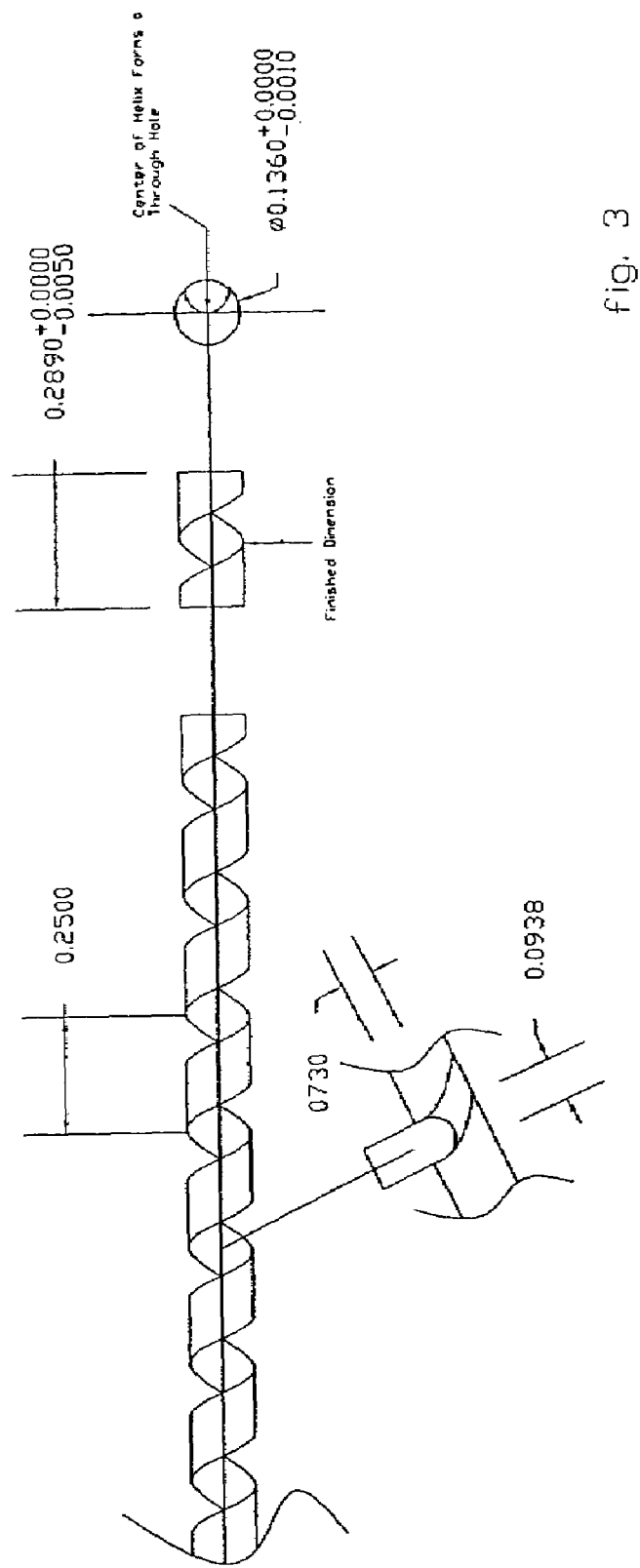
FIG. 3 illustrates a side view and a cross sectional slice of a twister element which is a component of the end fitting of each end of the basic straw tube detector of FIG. 1. The cross sectional area view is taken across a width that encompasses 180° of turn of the helix of the twister. The circumference of the twister is also portrayed.
Figure 7:
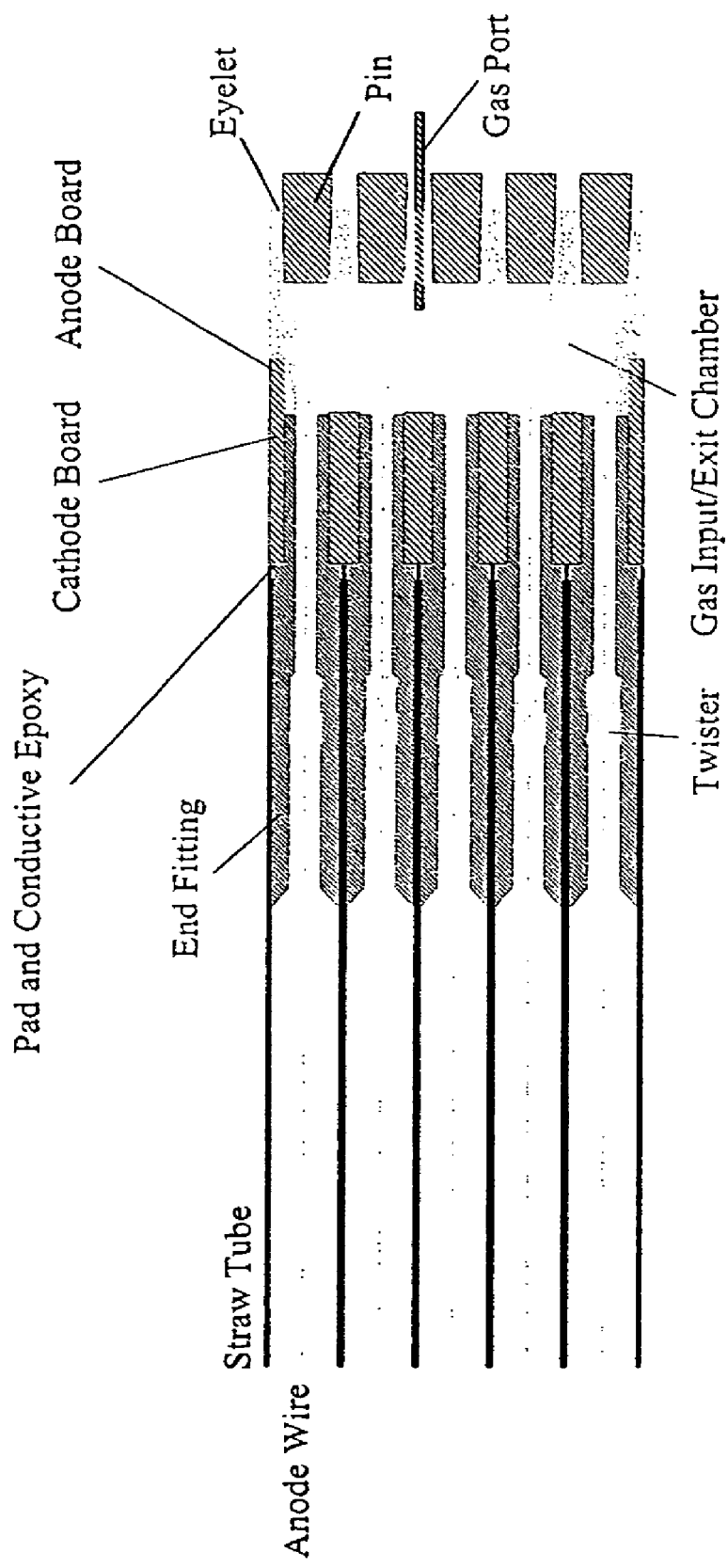
FIG. 7 illustrates in cross sectional view of one end of a module of a closely packed array of straw tube detectors as this array is assembled with the cathode board—anode board of FIGS. 5 and 6 and as the anode wire of each straw tube detector is electrically connected to its corresponding terminal in the anode board.

FIG. 7 shows a cross-sectional schematic of the module design. A "twister" component, shown in greater detail in FIG. 3, was developed to permit precise wire centering. The twister component was machined from a high performance insulating polymer which provides excellent mechanical properties and can be machined and bonded easily, for example Ultem® 1000 (General Electric Company). As illustrated in FIG. 3 the twister 20 has a helical structure and its length may be about 0.110"–0.115". In any given thin cross-section of the twister over half of the cross-sectional area 21 of the twister is open space 24. When these cross-sections are summed together to form a complete helix there exist a cylindrical space 22 running down the entire length of the twister which approximates the diameter of the anode wire it will ultimately receive, for example 0.003"–0.005" in diameter, and this cylindrical space 22 is precisely centered. Advantages of this twister design are convenience, low-cost fabrication and compatibility with precise anode wire centering through efficient air-driven wire placement.

As shown in FIG. 4 view B the twister 20 is housed inside a simple end fitting sleeve 30 (view A of FIG. 4), which was manufactured on a bench lathe from a high performance insulating polymer which provides excellent mechanical properties and can be machined and bonded easily, for example from Ultem® 1000. The end fitting sleeve is open-ended 32 and 34 and has a bottle-shape and a central channel 36 that tapers in slightly to form a shoulder 38 so that the twister 20 can be seated firmly against shoulder 38. Using a micro drop of glue, the twister component may be permanently affixed inside the end fitting sleeve, and identical end fittings 50, comprising a sleeve and twister, are epoxies into each end of the straw. While the base 40 of the fitting sleeve 30 sits inside the straw, a 'neck' 42 of a reduced diameter protrudes out and serves as a male connector to a fiberglass board assembly that is mounted at each end of the array.

Figure 5:
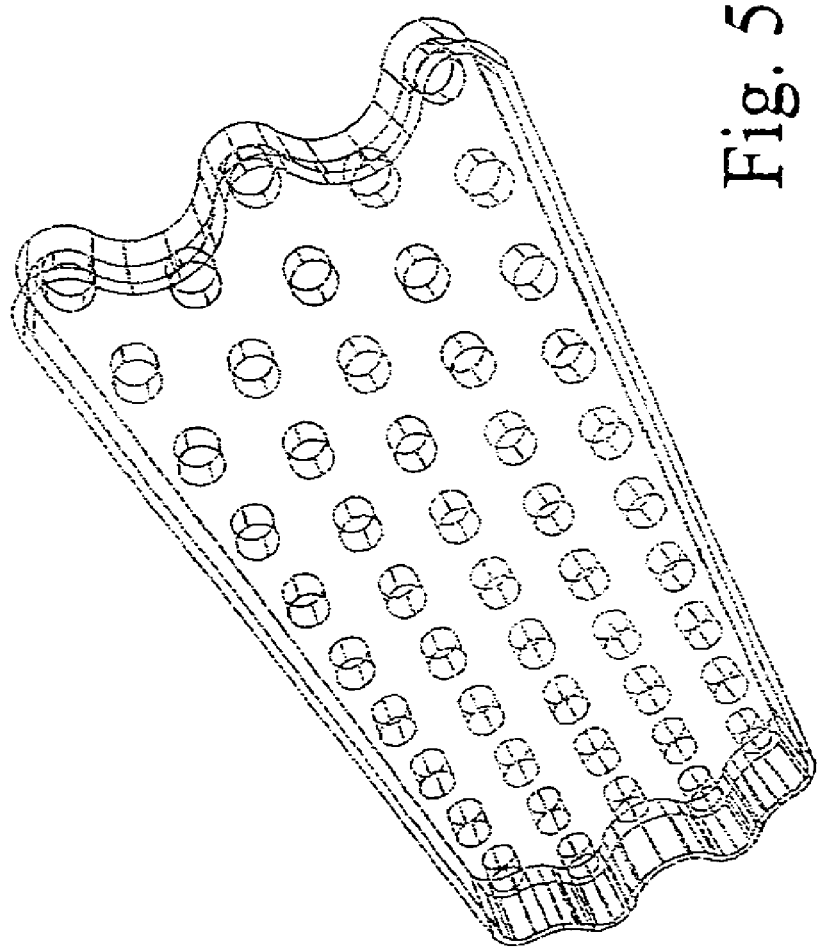
FIG. 5 illustrates the cathode board from a perspective of its outer face, which together with a anode board as per FIG. 6 form a module end fitting for an array of straw tube detectors.
Figure 6:
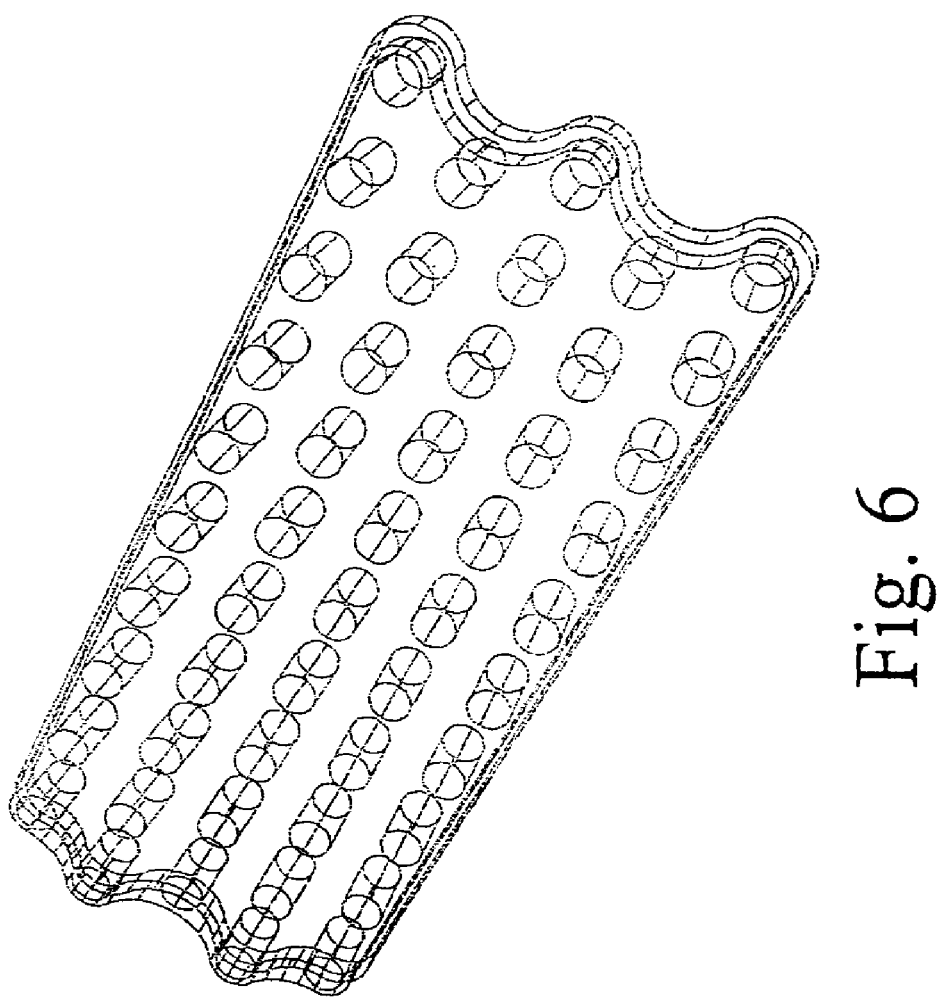
FIG. 6 illustrates the anode board from a perspective of its outer face, which together with an cathode board as per FIG. 5 form a module end fitting for an array of straw tube detectors.

As shown in FIGS. 5–7 a dual-board assembly was developed that permits electrical connection, gas flow, and wire tensioning. This assembly consists of two (fiberglass) circuit boards preferably of fiberglass, a cathode board 52 as shown in FIG. 5 and an anode board 54 as shown in FIG. 6. The neck 42 of straw end fittings 50 plug into apertures 57 positioned through the outer face 56 of the cathode board, which is coated with a uniform conductive layer, facilitating a single common high voltage connection.

FIG. 5 illustrates the cathode board 52 from the perspective of its outer face 56 whereas the cathode board 52 in cross sectional view may be seen in FIG. 7. Cathode board 52 is prepared with apertures 57 that are dimensioned to receive the neck 42 of the sleeve of a tube end fitting. Apertures 57 are positioned across the outer face 56 of cathode board 52 in a pattern that corresponds to a straw tube array that will plug into the cathode board. As FIG. 7 illustrates, the cathode board 52 incorporates a milled recess 66 and a protruding lip 68.

Since individual anode signal readout is required, as best seen in FIG. 6, each pad on the anode board 54 leads to a unique termination 58 adjacent to the corresponding aperture, or hole, in the cathode board. The anode board also included a hole 60 for a gas entry/exit port and high voltage connection. As shown in FIG. 7 the dual board design when assembled is also compatible with efficient threading, tensioning, and attachment of the anode wire. Anode wires are held with tension in electrical contact to the anode board using a tapered pin 62 and a brass eyelet 64. This procedure is explained in further detail below. As seen in FIG. 7, the anode board has an inset 70 milled around the edge of the anode board which corresponds to the protruding lip 68 of the cathode board. With this design, the two boards fit together snugly and form an interior cavity 72. The straw end fittings form an open connection to the resulting chamber, which is fed by a gas port 60 of the anode board. In this manner, effective gas flow is achieved through a single entry and exit port. Finally, this dual board assembly is designed to have apertures 57 in the cathode board 52 and terminations 58 in the anode board 54 that match precisely the cross sectional area of a straw array, so that modules of straws can then be closely packed to form a large area detector, if desired. Electrical contact between the anode wire and the anode board is achieved using a brass eyelet 64.

Using a jig support structure to prevent crushing, straws are cleanly cut into the desired lengths, for example 10 cm. Assembly of straws into closely packed honeycomb-like arrays is quite feasible by constructing individual rows, which are then stacked vertically. After inserting the twister-sleeve end fitting inside the straws, straws are arranged adjacent to each other atop a granite slab to ensure linearity. An alignment device may be used to gently hold the tubes in place while they are bonded together using spot application of fast setting cement applied with a hypodermic syringe. Each layer is then positioned so that straws of one layer fit into grooves created by the top of an underlying row of straws. This assembly technique results in very sturdy straw tube arrays.

In the first step of module assembly, the preconstructed straw tube array is connected to the cathode board. Conductive epoxy is liberally applied to the inside surfaces of the apertures 57 in the cathode board 52, and the straw array is plugged into the cathode board. The displacement of excess epoxy provides a secure electrical connection between the $^{10}B_4C$ interior cathode shells and the cathode board which is coated with a uniform conductive layer. This process is performed for both ends of the array. The connection provides a secure seal, preventing gas leakage, and helps to maintain structural integrity. Using a micro drop of conductive epoxy, an eyelet is then affixed in each termination hole 58 of the anode board 54, thereby establishing electrical connection and fixation. Non-conductive epoxy is then applied around the edge of each eyelet forming a tight seal to prevent gas leakage. The anode board is then mated to the cathode board through the lip 68 of the cathode board 52 and the inset 70 milled around the edges of the anode board 54, and the lip-inset connection is sealed using epoxy to prevent gas leakage. Two redundant high voltage connectors and a gas flow port through aperture 60 are also connected to the anode board. The final product is shown in FIG. 7.

Another advantage offered by this module design is a greatly improved technique for wire threading and tensioning. This technique allowed these steps to be performed for an entire array of straw tube detectors in a quick and efficient manner. A module, consisting of a straw tube array with a dual-board assembly structure mounted on each end, is mounted in a jig. A gas-driven threading system is implemented by connecting compressed gas, such as argon, (about 15 psi) through a plastic hose to a length of small diameter copper tubing in which a small hole has been drilled that approximates the diameter of the anode wire to be used. For each straw in the array, the copper tubing is inserted through a termination hole 58 in the anode board, through the chamber 72, and down to the end fitting of the straw tube corresponding to that termination hole. When a high flow of gas is achieved, a columnar gas flow through the copper tubing and the straw tube is created. A spool of anode wire is positioned at one end of the setup, and anode wire is inserted through the small hole drilled in the copper tubing. The rapid gas jet produces sufficient tension in the wire so that it may be easily fed through the straw by simply rotating the source wire reel until the wire appears at the output end of the straw. For each straw, after spooling the wire through its length, the copper tubing is removed, and a small brass pin 62 as illustrated in FIG. 7 is inserted to hold the wire in place against the metal eyelet 64 in the anode board. A small weight (20 g) is attached to the other end of the wire to apply required tension, and a second brass pin is inserted in the anode board at the other end of the module. The pin 62 is slightly tapered and closed on one end and machined to match the diameter of the eyelet 64, thereby ensuring a snug fit. In this manner, secure electrical connection to the anode board, reliable wire tension, and gas containment are maintained. Because highly accurate longitudinal position measurement is desired in the neutron detector, a high resistivity wire (like 20 µm Stablohm 800, California Fine Wire Co.) is utilized.

FIG. 7 illustrates one end of a modular assembly of closely packed straw tube detectors with anode wires installed and electrical connections between the cathode board and the $B_4C$ cathode interior shell coating and between the anode wires of each tube with its respective anode board termination 58 is shown as all elements thereof are in their operative assembly. Not illustrated in FIG. 7 is the operative connection of gas part 60 in one anode board end since means for such connection to a counter gas, as like Ar 98%-ethane 2%, would be readily apparent to one skilled in the art.

Counting Gas

Gas mixtures comprised of varying ratios of argon and ethane ($C_2H_6$) were examined to determine if there was an optimum level of quench ethane gas for stable detector performance, long lifetime, and gamma discrimination. It was found that relatively low levels of $C_2H_6$ improved the energy resolution of a straw tube arrayed detector, 19% FWHM at 5.9 keV for a 98% Ar 2% $C_2H_6$ mixture at a charge gain of 100. At larger gains, the energy resolution obtained with the 98/2 mixture degraded to about 25% FWHM which is still sufficient to easily discriminate neutrons from gammas. A low percentage of ethane quench gas also reduced the level to which neutron events were saturated. Saturation of the neutron events results in a measured energy that is lower than is actually deposited in the detector, i.e. nonlinear performance.

To determine what benefits could be obtained by varying the mixing ratios of Ar and $C_2H_6$, neutron spectra were taken for four different gas mixtures: $Ar/C_2H_6$ (50/50), $Ar/C_2H_6$ (72/28), $Ar/C_2H_6$ (92/8), and $Ar/C_2H_6$ (98/2). The operating voltage for read out for each mixture was chosen so that spectra could be taken at an equivalent charge gain of about 104, as determined by the amplitude of pulses from 5.9 keV $^{55}Fe$ X-rays. By comparing the neutron spectra taken for the different gas mixtures dual advantages of an ameliorated saturation effect and improved energy resolution for a small admixture of ethane was seen to allow for better gamma discrimination at high detector gains. For a constant gain, a reduced amount of ethane quench gas improves the distinction between the rapidly falling, low deposited energy gamma events, and the neutron events that form a broad peak in the upper higher energy channels. Using a small percentage admixture of ethane quench is also beneficial from the perspective of lifetime extension since there will be less hydrocarbon available to polymerize and deposit onto the anode wire. A 98/2 mixture of $Ar/C_2H_6$ minimizes the saturation of neutron events seen at high gains and should increase the lifetime of the straw detector.

Read Out Circuit

Figure 8:
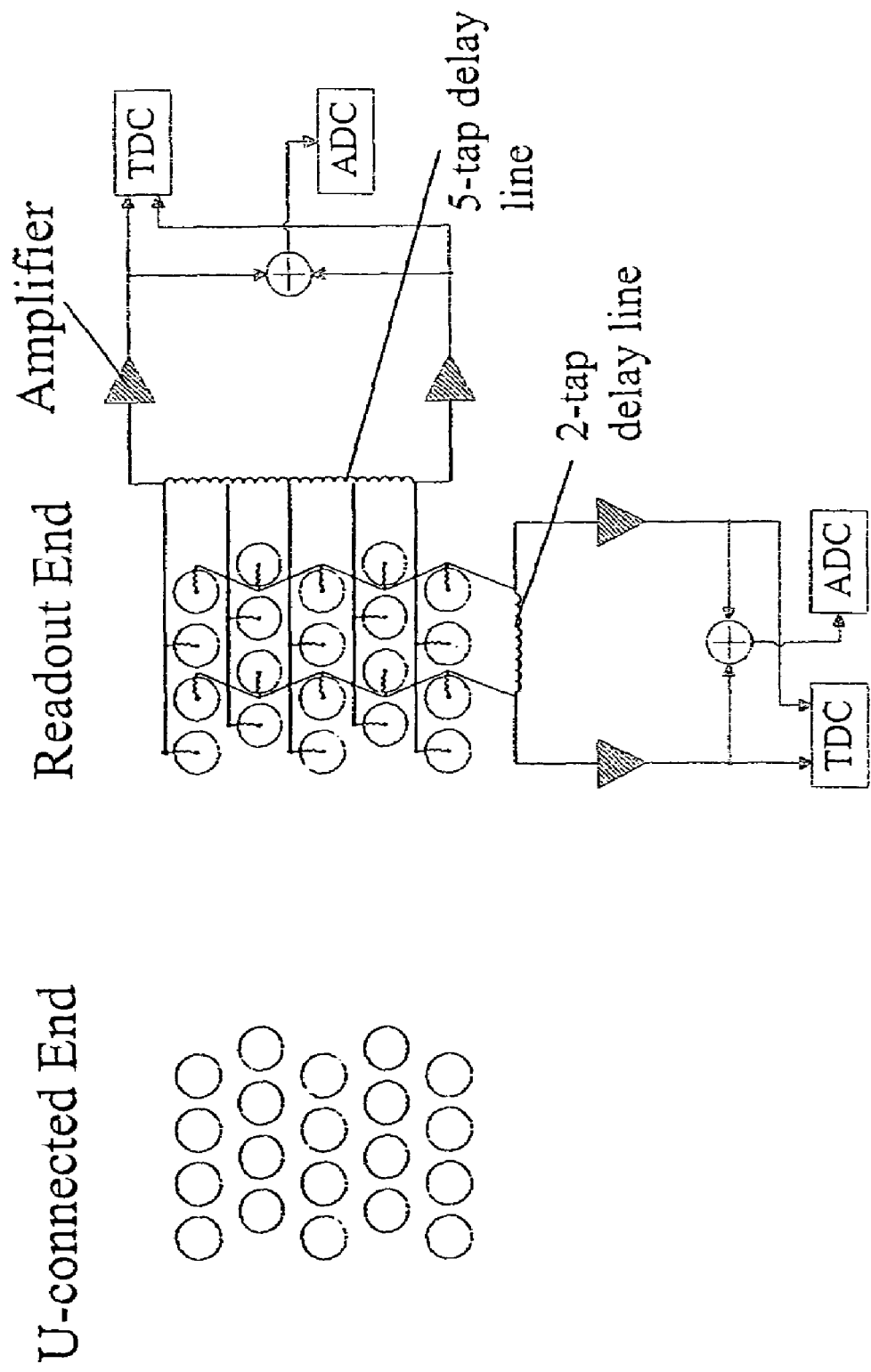
FIG. 8 illustrates an N×M matrix read out circuit for an N×M array of straw tube detectors assembled in a module.
Figure 9:
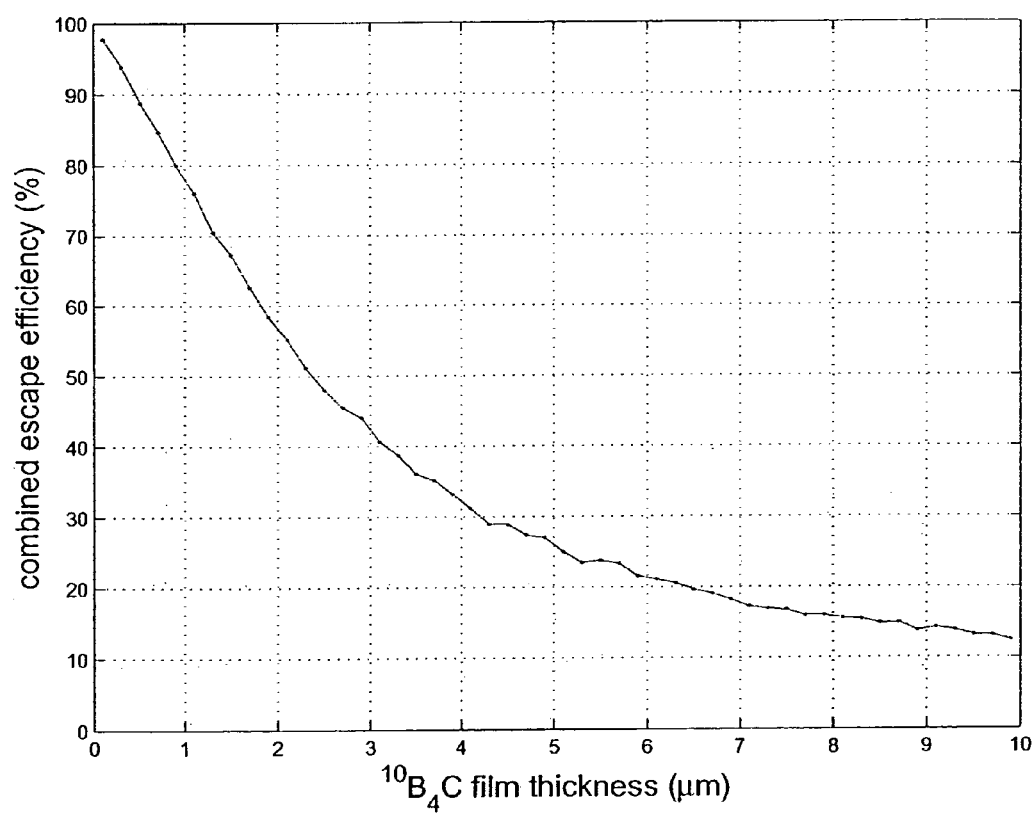
FIG. 9 plots the results of a Monte Carlo simulation for the efficiency with which one of the two neutron reaction products, either the $^4$α or the $^7$Li fragment, escape from a single thin $^{10}$B$_4$C layer into the gaseous interior of the straw. Use of layer thicknesses above about 1 μm have a significant impact upon sensitivity.
Figure 10:
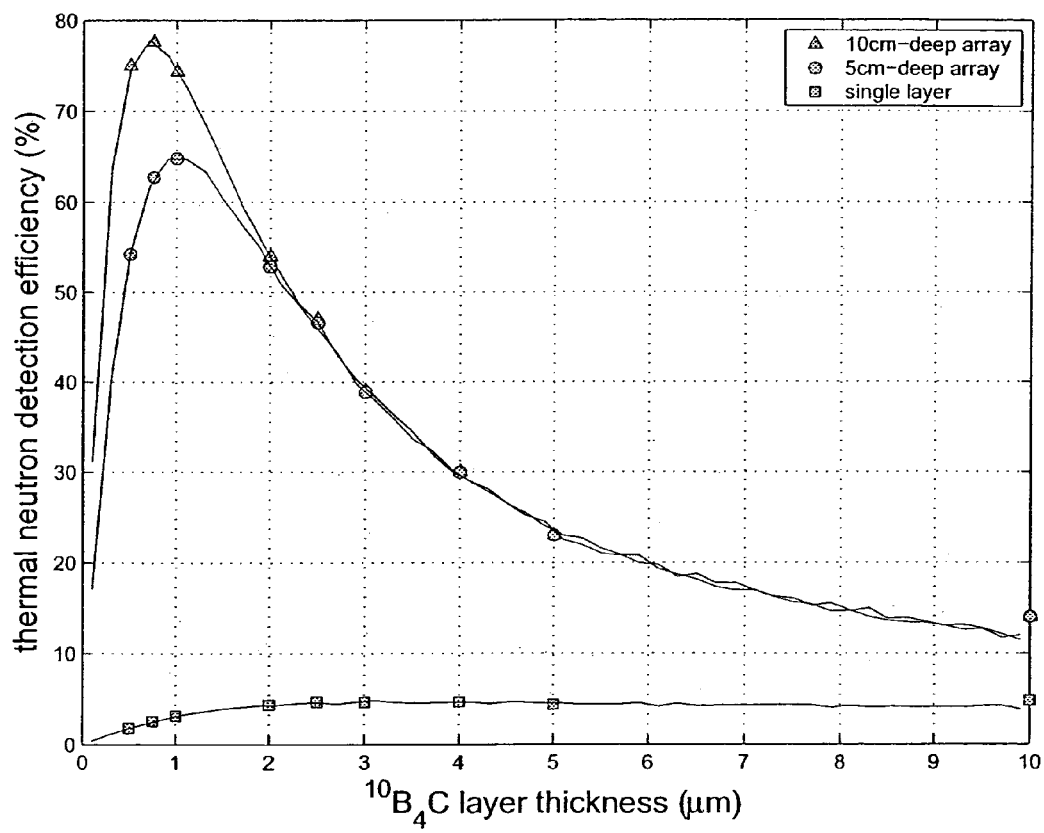
FIG. 10 plots the thermal neutron detection efficiency of 5 cm and 10 cm deep closely packed arrays of straw detectors of diameter of 4 mm, as a function of the thickness of the B$_4$C layer lining each straw. The efficiency of a single planar layer of B$_4$C is simulated as well, assuming gamma ray escape is detected at one face only.
Figure 11:
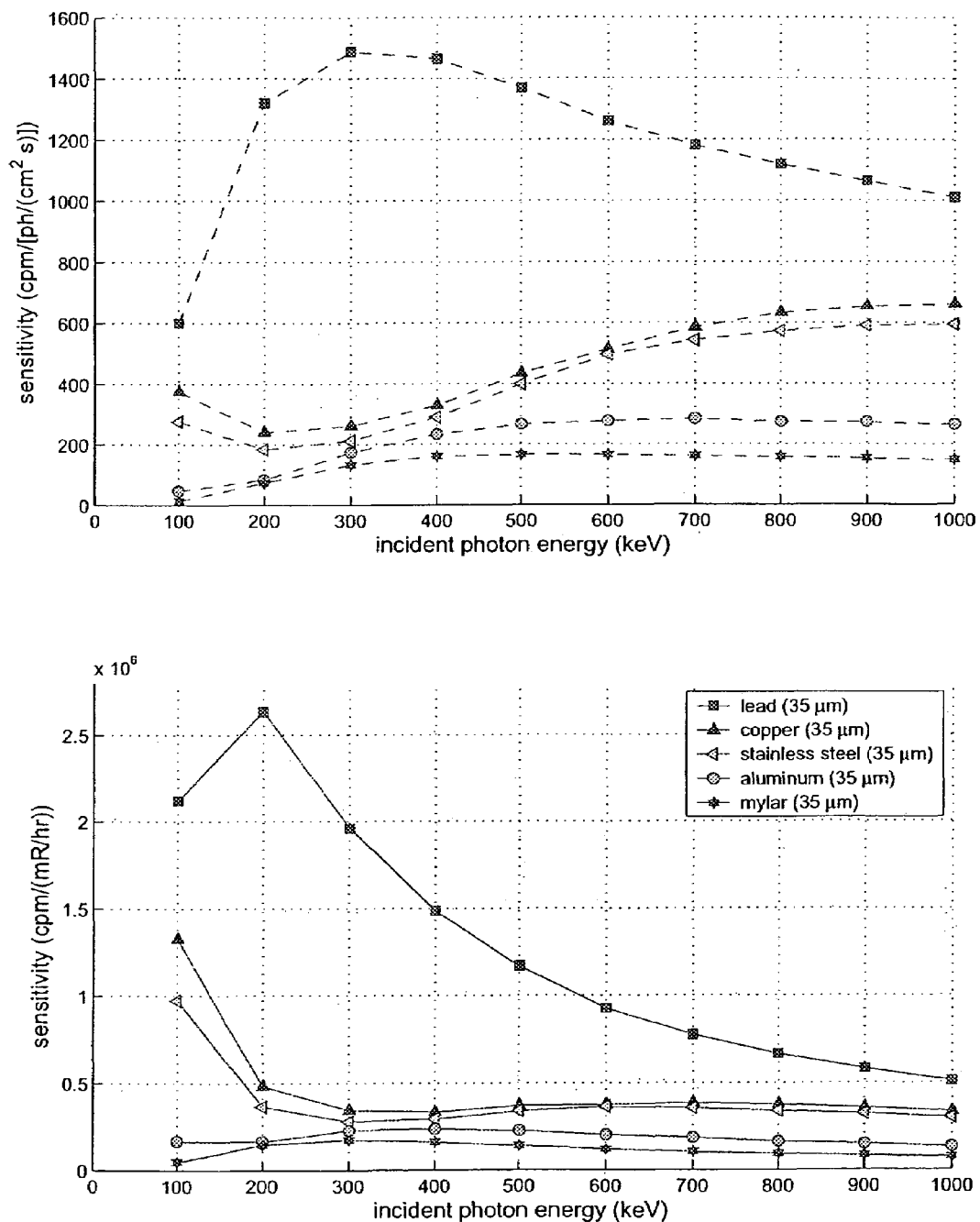
FIG. 11 plots the results of a Monte Carlo simulation for the flux (top) and dose (bottom) sensitivities of a proposed 5 cm deep array of closely packed straw detectors, in which each straw is made out of the material indicated and whose wall thickness is 35 μm. It is assumed that the thin B4C layer (approximately 1 μm does not contribute significantly to gamma sensitivity).

Because of the large number of detector elements, straw readout issues are of importance. Modularization of the arrays of elemental straw tube detectors greatly reduces the number of channels and, accordingly, the amount of electronics required, lowering cost but raising an issue of straw decoding (i.e. which straw tube detector in a module fired). Delay line readout offers a viable approach because signals from several inputs can be differentiated based on time of arrival. Taking advantage of the high anode resistivity and using additional termination resistors, straws can be connected along rows on one end and along columns on the other end, as illustrated in FIG. 8. Thus, the module is read out as an N×M matrix using two multitap delay lines, one for rows and one for columns. Difference in time of signal arrival enable determination of which row and column fired. Because it requires a relatively low number of electronics components, the technique can be implemented quite cost effectively.

In order to achieve efficient, optimally cost effective readout of large arrays of boron straws, the electronics must combine straw identity decoding with resistive charge division readout of longitudinal position. Delay lines offer an attractive approach to straw identity decoding because signals from many straws can be fed into a single amplifier with a small delay separating each. A problem with this approach is that straw identity is lost in such passive addition of signals. Therefore, a method of decoding straw identity was developed through use of a simple delay line method. In this technique as illustrated by FIG. 8, anode signals are connected through the termination resistors to successive taps on a multitap delay line. Since signals are typically very fast, a delay of 5–10 ηsec is quite sufficient to allow decoding based on time.

These small delays interfere very little with the integration of the charge delivered in the signal and thus resistive longitudinal readout is not impaired. This technique takes advantage of the additional powerful method of row-column organization to further achieve reduction of components. Such a system, applied to a 20-straw array of 2 mm diameter straws, is shown in FIG. 8.

One end of the straw array module had only a passive U-connection board, where each pair of adjacent straw anodes were connected together, so that all readout electronics may be placed on the other end. This scheme also reduced the number of taps needed on the delay line. Thus, although the straw array illustrated by FIG. 8 is actually a 5×4 row-column matrix, it was read out as a 5×2 matrix of 20 cm long "effective", U-connected straws, which had both readout ends on the same end of the module.

The "effective straws" of the above example were connected together through resistors along rows on one end and along columns on the other end. Each row was connected to a tap in a 5-tap delay line, and each column was connected to a tap in a 2-tap delay line. Since each tap delays the signal by a fixed time, the difference in time of arrival at each end of the delay line indicated which row or column contained the firing straw. Events were histogrammed based on the differences in arrival times, and a count profile was generated for each delay line. For each delay line, the outputs from both ends of the delay line were also summed together to give A and B signals. Thus, spatial resolution was measured using an A/(A+B) charge division technique with A and B measurement performed with a charge integrating ADC.

In the above example of a readout system, "effective" straw anodes were connected along rows on one end and along columns on the other end. Thus, all anodes were in effect connected together, raising some concerns regarding degradation of spatial resolution. The success of this approach largely relies upon the inherent resistance of the system. The count profiles produced by each delay line were well-differentiated peaks, allowing exact straw identification. Use of delays lines with greater time delay per tap would enable peaks to be even better resolved. In addition, excellent charge division spatial resolution of 1.74 mm was achieved. This performance was equivalent to that displayed by the module without delay lines, which showed 1.83 mm resolution.

As described above, in order to accommodate the needs of a large variety of applications, a generic straw detector module may be constructed distinct from the electronics used to read it out. Varying electronics modules can then be used to process these signals according to the needs of the specific application.

In a 2D application, only the XY location of an event is desired while the Z-coordinate can be ignored. This low-cost solution, as compared to full 3D readout, will serve as a simple planar detector, enabled to decode events in a 2D plane. Position in one dimension is achieved using charge division along the length of the detector module, while the other coordinate can be determined by using a simplified version of the row-column readout. This information, along with longitudinal position, will give an XY coordinate of the event detected.

If a more accurate readout system is desired, a fully 3D readout system can be employed simply by using a more advanced plug-in electronics module. This 3D module will interface with the detector in the same way as the 2D module did, but will incorporate a delay-line readout system in both the row and column directions. This will allow the detector to read out an accurate 3D position. Both 2D and 3D plug-in electronics modules may be built that achieve high position resolution and can interface with a large array of neutron straws.

Another factor that can vary from application to application is the count rate desired from the detector. Current paralleling techniques that connect a large number of straws together into one amplifier cannot handle very large count rates due to the large dead time of such a system. In a paralleled system, only one straw in a module can fire at a given time without ambiguity. If a very high count rate is desired, a separate readout system can be used for each straw individually, instead of a module in aggregate. For a 50-straw detector, this will allow a 50-fold increase in count rate while still maintaining spatial resolution. If a 2D system is required, each row, as opposed to each straw, can be connected to a separate amplifier for a lower cost solution than the full 3D system.

EXAMPLES

The thermal neutron sensitivity of a 10×5 array of straws was measured. The array was populated by 34 active straws of the 4 mm diameter and 77 mm active length, and with a $B_4C$ thickness of 2 μm. All anodes were tied together, such that events were registered from any one of the 34 straws. A neutron source was placed 10 inch away, and the flux was measured with a $BF_3$ tube. For a flux of 5.04 nv, there were 17.3 neutron counts per second in the array, resulting in a sensitivity of 3.4 cps/nv. This sensitivity predicts a single tube sensitivity of 0.10 cps/nv, which agrees very well with the value of 0.09 cps/nv measured for a single straw.

Fabrication of a rugged 50-straw, 10 cm long module was achieved utilizing a production technique as previously described. The end fittings and twister components were manufactured using low cost base materials and simple fabrication techniques, which permit both large-scale production and low per-unit expense. Since the large area neutron detectors will consist of several thousand straws, these factors are particularly important for these parts, which will be required in duplicate for each straw. Furthermore, the dual-board design provides a practical solution to module fabrication. Another key advantage of this design is that the main construction steps (wire centering and placement, gas flow, electrical connection) are met on the level of the module rather than for each straw element, and fabrication involves a series of operations that are performed for the array as a whole. Such an approach is much more practical than painstaking fabrication of individual 4 mm straw detectors.

In addition to the construction of a 50 straw module a 1 meter straw was constructed. The length of such a straw creates an issue of wire electrostatic instability. In order to maintain wire stability, an additional twister, with an Ultem housing sleeve, was positioned precisely at the center of the 1 m length. The twister was contained in a cylindrical shell, open on both ends, permitting the gas driven wire placement. The twister shell was tacked in place by piercing the straw body with a small gauge hypodermic needle and injecting a small drop of epoxy.

The successful construction of a 50-straw module and a 1 meter straw detector together provide proof that the proposed assembly techniques can be used to produce rugged large area detectors of 1 m$^2$ area.

I claim:

1. An article of manufacture useful in detection of neutron radiation, comprising a thin wall straw tube, said wall having a total areal density of less than 90 mg/cm$^2$ and having deposited on its inner surface a thin electrically conducting layer having a content of $^{10}$B of at least 10 wt %, said layer having a total thickness between 0.12 mg/cm$^2$ and 0.48 mg/cm$^2$.

2. The article of claim 1 wherein the thin wall is composed of one or more layers of metal, plastic or metallic coated plastic film, each having a thickness between 5 $\mu$m and 75 $\mu$m, bonded together with suitable adhesive, wherein the choice of materials is optimized for a desired gamma radiation sensitivity.

3. The article of claim 2 wherein the straw wall is composed of layers of materials having minimal hydrogen content to minimize scattering of low energy thermal neutrons.

4. The article of claim 2 further employing walls of low Z, hydrogen free materials to minimize the sensitivity for gamma ray interactions.

5. The article of claim 2 wherein a layer or layers of the wall comprises a high Z material in order to enhance sensitivity to gamma rays.

6. The article of claim 1 wherein the wall layers comprises a composition having a Z near that of Fe, which composition produces an optimally linear count response in proportion to the physiological dose equivalent of radiation impinging on the straw.

7. The article of claim 1 in which a thin conducting wire is held at electrically stable tension at the center of the straw, utilizing electrically insulating end fitting means at each end of the straw, and in which when an electrical potential is applied a positive electrical potential upon the wire is produced relative to the straw wall.

8. The article of claim 7 in which signal detection means are connected to the central anode wire, for amplification and detection of charge signals produced in the wire.

9. The article of claim 8 in which charge signals arising from a threshold in the range 50–150 keV ionization deposition in a gas within the straw are discriminated from smaller signals and are counted as neutron events.

10. The article of claim 8 in which charge signals between 0.5 keV and 150 keV ionization deposition in the straw gas are detected and counted as gamma ray events.

11. The article of claim 8 in which charge signals between 0.5 keV to 150 keV and charge signals greater than 150 keV are simultaneously counted respectively as gamma events and neutron events.

12. An article of manufacture, comprising an array of closely packed straws of claim 7 with all wires connected together and employing a detection means for detection of events having charge delivery arising from ionization deposition in a gas within the straw above a threshold level between 50–150 keV.

13. An article of manufacture, comprising an array of closely packed straws of claim 7 with all wires connected together and employing a detection means for separate detection of events having charge delivery above a threshold level between 50–150 keV and events having charge delivery between 0.5–50 keV.

14. An article of manufacture, comprising
a small diameter straw tube having a thin layer of B$_4$C of a thickness of 0.5 to 2 $\mu$m on its interior surface.

15. An article of manufacture, comprising
a small diameter straw tube having a thin layer of B$_4$C of a thickness of 0.5 to 2 $\mu$m on its interior surface,
an end fitting means affixed in each end of said straw tube which is capable of receiving and positioning a wire centrally within said straw tube out of electrical communication with said coating of B$_4$C and capable of allowing a flow of gas through said tube.

16. An end fitting means, comprising;
a twister element having a helical configuration which defines a central aperture;
a cylindrical envelope designed for receiving said twister element in a secure relationship;
said cylindrical envelope with said twister element secured therein being passable of a gas when said end fitting means is installed within a straw tube body.

17. An article of manufacture, comprising
a small diameter straw tube having a thin layer of B$_4$C of a thickness of 0.5 to 2 $\mu$m on its interior surface,
an end fitting means affixed in each end of said straw tube which is capable of receiving and positioning a wire centrally within said straw tube out of electrical communication with said coating of B$_4$C and capable of allowing a flow of gas through said tube, and
a wire positioned centrally within said straw tube out of electrical communication with said coating of B$_4$C.

18. An article of manufacture, comprising
a close packed array of a plurality of small diameter straw tubes, each of said tubes having
a thin layer of B$_4$C of a thickness of 0.5 to 2 $\mu$m on its interior surface,
an end fitting means affixed in each end of said straw tube which is capable of receiving and positioning a wire centrally within said straw tube out of electrical communication with said coating of B$_4$C and capable of allowing a flow of gas through said tube, and
a wire positioned centrally within said straw tube out of electrical communication with said coating of B$_4$C,
array end fitting means for receiving said close packed array of a plurality of small diameter straw tubes and separately electrically connecting said B$_4$C coating and said centrally positioned wire of each tube to circuit means by which it may be determined which of said plurality of small diameter straw tubes has experienced a neutron capture event, said array end fitting means also providing means for allowing passage of a gas into said plurality of small diameter straw tubes.

19. The article of claim 18, wherein said $B_4C$ is enriched in its content of $^{10}B$ beyond the natural abundance of $^{10}B$ content in elemental B.

20. The article of claim 18, wherein said straw tube has a length at least 25 times greater than its diameter.

21. The article of claim 18, wherein said straw tube has a diameter of 4 mm or less.

* * * * *